United States Patent [19]
Tajima et al.

[11] Patent Number: 5,880,572
[45] Date of Patent: Mar. 9, 1999

[54] VARIABLE-SPEED CONTROL METHOD AND APPARATUS FOR AC MOTOR

[75] Inventors: Hirokazu Tajima; Hidetoshi Umida, both of Tokyo; Hiroshi Tetsutani, Hyogo, all of Japan

[73] Assignee: Fuji Electric Co., Ltd., Kawasaki, Japan

[21] Appl. No.: 839,527

[22] Filed: Apr. 14, 1997

[30] Foreign Application Priority Data

Apr. 18, 1996 [JP] Japan .................................. 8-095754

[51] Int. Cl.$^6$ ...................................................... H02P 7/42
[52] U.S. Cl. ............................ 318/800; 318/806; 318/814
[58] Field of Search .................................. 318/798–817, 318/767, 772, 766; 364/571.01, 578, 579

[56] References Cited

U.S. PATENT DOCUMENTS

| | | | |
|---|---|---|---|
| 4,967,135 | 10/1990 | Ashikaga et al. | 318/808 |
| 5,481,173 | 1/1996 | Yamamoto | 318/801 |
| 5,594,670 | 1/1997 | Yamamoto | 364/571.01 |
| 5,598,081 | 1/1997 | Okamura et al. | 318/801 |
| 5,644,206 | 7/1997 | Yura | 318/807 |

FOREIGN PATENT DOCUMENTS 0644648  3/1995  European Pat. Off. .

Primary Examiner—Jonathan Wysocki
Attorney, Agent, or Firm—Greer, Burns & Crain Ltd.

[57] ABSTRACT

A variable-speed control apparatus computes the leakage inductance of an AC motor, correctly compensates the leakage inductance, and controls the variable speed of the AC motor. The variable-speed control apparatus has an AC signal generation circuit for generating an AC signal, and obtains a leakage inductance calculation value of the AC motor based on the AC signal and the measured actual current value. The differential value of the summation of a current command value and the AC signal is multiplied by the leakage inductance calculation value to generate a signal for use in compensating the voltage drop caused by the leakage inductance, and added to a voltage command value to cancel the deviation between the actual current value and the M-axis current command value and to obtain the second voltage command value. The second voltage command value is converted into a 3-phase voltage command value and used in controlling the AC motor, and the voltage drop caused by the leakage inductance can be compensated.

16 Claims, 11 Drawing Sheets

Fig. 4
(1) M-AXIS CURRENT COMMAND VALUE
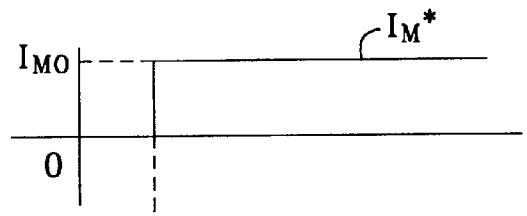
(2) AC SIGNAL
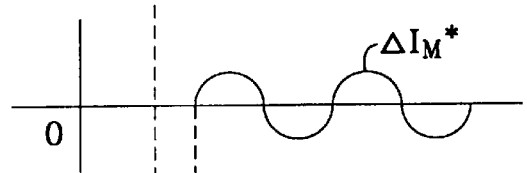
(3) M-AXIS CURRENT COMMAND VALUE AFTER ADDITION OF AC SIGNAL
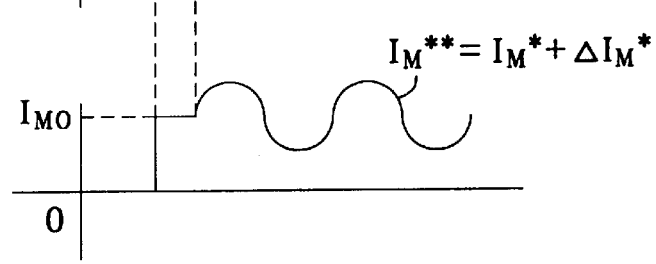
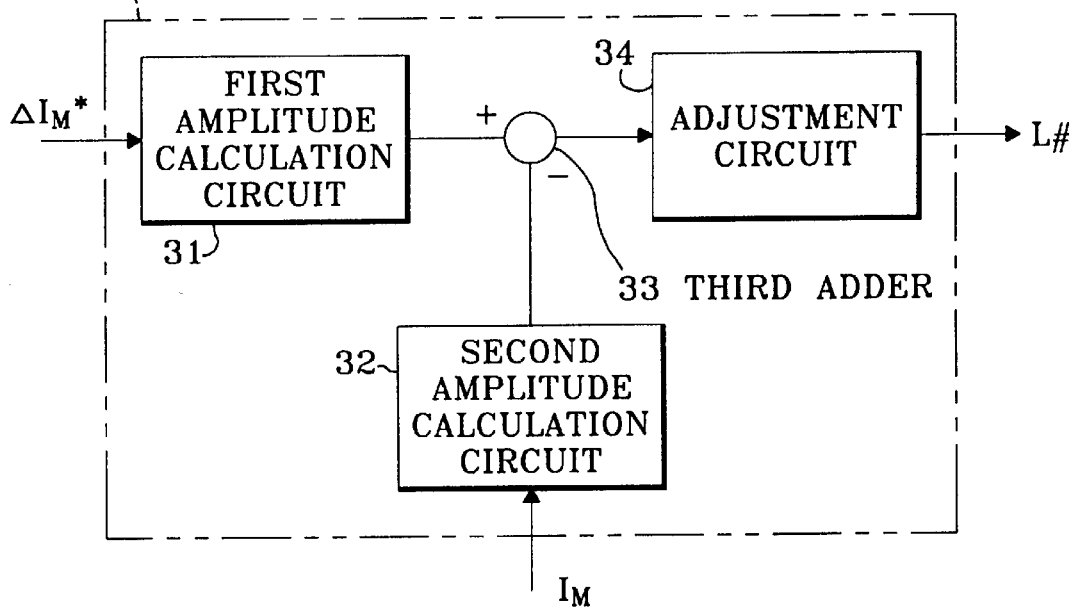
Fig. 5

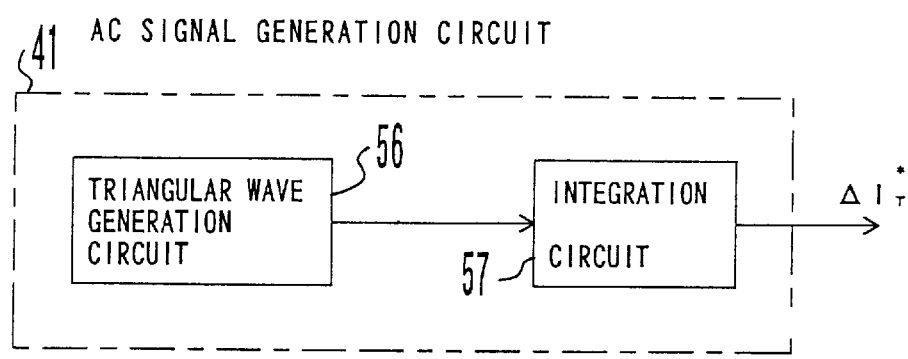
F I G. 1 4

VARIABLE-SPEED CONTROL METHOD AND APPARATUS FOR AC MOTOR

BACKGROUND OF THE INVENTION

1. Field of the Invention

The present invention relates to a variable-speed control apparatus for controlling the variable speed of an AC motor.

2. Description of the Related Art

Generally, an induction motor is used as an AC motor. The terminal voltage of the induction motor includes a transient voltage represented by the product of the differentiation term of a primary current and the leakage inductance of the induction motor. In controlling the electric current to an AC motor, the transient voltage is reduced by the feedforward compensation method in which the product of the differentiation term of a current command value and a predetermined leakage inductance is computed and the result is added to a voltage command value.

FIG. 1 is a block diagram showing an example of the conventional variable-speed control apparatus for an induction motor which reduces the transient voltage by the feedforward compensation method.

In FIG. 1, an induction motor 3 is operated at a variable speed by converting the AC power provided by an AC power source 1 into an AC power of a desired voltage and frequency by a power converter 2. In the variable-speed control apparatus which controls the power converter 2, the U-phase current actual value $i_u$ and the W-phase current actual value $i_w$ in the 3-phase output of the power converter detected by current detectors 4 (at least two of three phase outputs) are divided by a first coordinate conversion circuit 5 into the M-axis current actual value $I_M$, which is the current in the M-axis direction (component in the magnetic flux direction) of the motor, and the T-axis current actual value $I_T$, which is the current in of the T-axis direction (component in the torque direction). The M-axis is perpendicular to the T-axis. A command value generation circuit 7 outputs the M-axis current command value $I_M^*$ and T-axis current command value $I_T^*$. An M-axis current adjuster 8 outputs a signal $V_M^{**}$ which sets the deviation to zero between the M-axis current actual value $I_M$ and the M-axis current command value $I_M^*$. A T-axis current adjuster 9 outputs a signal $V_T^{**}$ which sets the deviation to zero between the T-axis current actual value $I_T$ and the T-axis current command value $I_T^*$. If these axis current adjuster outputs $V_M^{}$ and $V_T^{}$ are provided as voltage command values for the power converter 2 through a second coordinate conversion circuit 6, the above described transient voltage is generated.

Then, the leakage inductance set value L* which is predetermined in the command value generation circuit 7, the M-axis current actual value $I_M$, the T-axis current actual value $I_T$, the M-axis current command value $I_M^*$, and the T-axis current command value $I_T^*$, are input to a feedforward compensation voltage operation circuit 11 to compute the M-axis feedforward compensation voltage command value $V_{MF}^*$ and the T-axis feedforward compensation voltage command value $V_{TF}^*$. An M-axis compensation voltage adder 12 adds the M-axis feedforward compensation voltage command value $V_{MF}^*$ and the above described M-axis current adjuster output $V_M^{**}$, and the sum $V_M^*$ is provided as an M-axis voltage command value for the second coordinate conversion circuit 6. Similarly, a T-axis compensation voltage adder 13 adds the T-axis feedforward compensation voltage command value $V_{TF}^*$ and the T-axis current adjuster output $V_T^{**}$, and the sum $V_T^*$ is provided as a T-axis voltage command value for the second coordinate conversion circuit 6. The second coordinate conversion circuit 6 converts the M-axis voltage command value $V_M^*$ and T-axis voltage command value $V_T^*$ into 3-phase voltage command values $v_u^*$, $v_v^*$, and $v_w^*$. The power converter 2 is controlled using these 3-phase voltage command values $v_u^*$, $v_v^*$, and $v_w^*$.

The operations performed by the above described feedforward compensation voltage operation circuit 11, M-axis compensation voltage adder 12, and T-axis compensation voltage adder 13, are expressed by the following equations (1) and (2).

$$V_M^* = V_M^{**} + V_{MF}^* = V_M^{**} + p \cdot L^* \cdot I_M^* \tag{1}$$

$$V_T^* = V_T^{**} + V_{TF}^* = V_T^{**} + p \cdot L^* \cdot I_T^* \tag{2}$$

where p indicates the differential operator, and L* indicates a leakage inductance set value.

The actual current value and actual voltage value are detected to compute the M-axis induction voltage $E_M^*$ and T-axis induction voltage $E_T^*$ of an induction motor by the following equations (3) and (4).

$$E_M^* = V_M - R1^* \cdot I_M - p \cdot L^* \cdot I_M + \omega 1 \cdot L^* \cdot I_T \tag{3}$$

$$E_T^* = V_T - R1^* \cdot I_T - p \cdot L^* \cdot I_T + \omega 1 \cdot L^* \cdot I_M \tag{4}$$

where $I_M$ indicates an M-axis current actual value, $I_T$ indicates a T-axis current actual value, $V_M$ indicates an M-axis voltage actual value, $V_T$ indicates a T-axis voltage actual value, R1* indicates a primary resistance set value, and $\omega 1^*$ indicates the frequency set value.

The control by obtaining the induction voltage from the actual voltage value and actual current value is disclosed as, for example, the "speed-sensorless vector control" in the Japanese Patent Publication Tokukohei No. 7-71400.

The M-axis voltage command value $V_M^*$, T-axis voltage command value $V_T^*$, M-axis induction voltage $E_M^*$, and T-axis induction voltage $E_T^*$, are computed by each of the above listed equations. Each of the equations contains an operation for the voltage drop caused by the leakage inductance. Therefore, if there is a difference between the leakage inductance set value L* and the actual leakage inductance value of a motor used in the operation for the voltage drop, then there will be an error in the operation for the induction voltage and in the feedforward compensation by the conventional variable-speed control apparatus described above by referring to FIG. 1. As a result, there will also occur an error in controlling the motor from the feedforward compensation, thereby incurring a disadvantage that, for example, the transient voltage cannot be appropriately reduced.

The present invention aims at providing a circuit for appropriately controlling a motor using a correctly obtained leakage inductance value of the motor.

SUMMARY OF THE INVENTION

The variable-speed control apparatus according to the present invention controls the variable speed of an AC motor (or an induction motor) by adjusting the current to be provided for the AC motor through a power converter. The variable-speed control apparatus includes a first coordinate conversion circuit for obtaining an M-axis current actual value (current in the magnetic flux direction) and a T-axis current actual value (current in the torque direction: perpendicular to the M-axis current) for the AC motor based on the detection value of the current provided to the AC motor; a command value generation circuit for generating an M-axis current command value and a T-axis current command value for the AC motor; an AC signal generation circuit for outputting an AC signal; a first adder for adding the M-axis current command value and the AC signal to output a current addition signal; an M-axis current adjuster for outputting a first M-axis voltage command value for use in canceling the deviation between the M-axis current command value and the M-axis current actual value based on the current addition signal and the M-axis current actual value; a leakage inductance calculation circuit for obtaining a leakage inductance calculation value of the AC motor based on the AC signal and the M-axis current actual value; a multiplier for multiplying the differential value of the current addition signal or the AC signal by the leakage inductance calculation value and outputting a multiplication signal; a second adder for adding the first M-axis voltage command value and the multiplication signal to output a second M-axis voltage command value; a T-axis current adjuster for outputting a T-axis voltage command value for use in canceling the deviation between the T-axis current command value and the T-axis current actual value; and a second coordinate conversion circuit for generating voltage command values (for example, 3-phase (u, v, and w) voltage command values) for the AC motor based on the second M-axis voltage command value and the T-axis voltage command value and outputting the values to the power converter. The power converter is controlled using the voltage command values, and the AC motor is variable-speed-controlled, thereby completing the feedforward compensation for a voltage drop caused by a leakage inductance.

The leakage inductance calculation circuit may include a first amplitude calculation circuit for obtaining and outputting the amplitude of the AC signal; a second amplitude calculation circuit for obtaining and outputting the amplitude of the M-axis current actual value; a third adder (subtracting unit) for subtracting the output of the second amplitude calculation circuit from the output of the first amplitude calculation circuit and outputting the difference; and an adjustment circuit for performing an integral operation or a proportional-plus-integral operation on the output of the third adder to obtain the leakage inductance calculation value.

The leakage inductance calculation circuit can further include a filter for selectively removing the component of a frequency lower than the frequency of the M-axis current actual value from the signal to be input to the second amplitude calculation circuit. Thus, even if an unnecessary low frequency component is superposed on the M-axis current actual value, the unnecessary component is cut by a filter and a leakage inductance can be correctly computed.

The AC signal generation circuit can include a triangular wave generation circuit for outputting a triangular wave, and an integration circuit for integrating the triangular wave and outputting the result as the AC signal.

The variable-speed control apparatus according to the present invention can further include a memory for storing a leakage inductance calculation value obtained by the leakage inductance calculation circuit. In this case, the multiplier multiplies the leakage inductance calculation value stored in the memory by the differential value of the current addition signal or the AC signal to obtain the multiplication signal. The variable-speed control apparatus can further comprise a signal selector for selectively outputting one of an output from the leakage inductance calculation circuit and an output from the memory to the multiplier. The signal selector selects the output from the leakage inductance calculation circuit when the AC motor is not operated, and selects the output from the memory when the AC motor is being operated.

The second variable-speed control apparatus according to the present invention includes a first coordinate conversion circuit for obtaining an M-axis current actual value and a T-axis current actual value for the AC motor based on the detection value of the current provided to the AC motor; a command value generation circuit for generating an M-axis current command value and a T-axis current command value for the AC motor; an AC signal generation circuit for outputting an AC signal; a first adder for adding the T-axis current command value and the AC signal to output a current addition signal; A T-axis current adjuster for outputting a first T-axis voltage command value for use in canceling the deviation between the T-axis current actual value and the T-axis current command value based on the current addition signal and the T-axis current actual value; a leakage inductance calculation circuit for obtaining a leakage inductance calculation value of the AC motor based on the AC signal and the T-axis current actual value; a multiplier for multiplying the differential value of the current addition signal or the AC signal by the leakage inductance calculation value and outputting a multiplication signal; a second adder for adding the first T-axis voltage command value and the multiplication signal to output a second T-axis voltage command value; an M-axis current adjuster for outputting an M-axis voltage command value for use in canceling the deviation between the M-axis current command value and the M-axis current actual value; and a second coordinate conversion circuit for generating voltage command values for the AC motor based on the second T-axis voltage command value and the M-axis voltage command value and outputting the values to the power converter. The power converter is controlled using the voltage command values, and the AC motor is variable-speed-controlled, thereby completing the feedforward compensation for a voltage drop caused by a leakage inductance.

The leakage inductance calculation circuit includes a first amplitude operation circuit for obtaining and outputting the amplitude of the AC signal; a second amplitude calculation circuit for obtaining and outputting the amplitude of the T-axis current actual value; a third adder (subtracting unit) for subtracting the output of the second amplitude calculation circuit from the output of the first amplitude calculation circuit and outputting the difference; and an adjustment circuit for performing an integral operation or a proportional-plus-integral operation on the output of the third adder to obtain the leakage inductance calculation value.

The leakage inductance calculation circuit can further include a filter for selectively removing the component of a frequency lower than the frequency of the T-axis current actual value from the signal to be input to the second amplitude calculation circuit. Thus, even if an unnecessary low frequency component is superposed in the T-axis current actual value, the unnecessary component is cut by a filter and a leakage inductance can be correctly computed.

The AC signal generation circuit can include a triangular wave generation circuit for outputting a triangular wave, and an integration circuit for integrating the triangular wave and outputting the result as the AC signal.

The variable-speed control apparatus according to the present invention can further include a memory for storing a leakage inductance calculation value obtained by the leakage inductance calculation circuit. In this case, the multiplier multiplies the leakage inductance calculation value stored in the memory by the differential value of the current addition signal or the AC signal to obtain the multiplication signal. The variable-speed control apparatus can further comprise a signal selector for selectively outputting one of an output from the leakage inductance calculation circuit and an output from the memory to the multiplier. The signal selector selects the output from the leakage inductance calculation circuit when the AC motor is not operated, and selects the output from the memory when the AC motor is being operated.

The variable-speed control method according to the present invention includes a step of obtaining an M-axis current actual value and a T-axis current actual value for the AC motor based on the detection values of the current provided for the AC motor; a step of generating an M-axis current command value and a T-axis current command value for the AC motor; a step of outputting an AC signal; a step of adding the M-axis current command value and the AC signal to output a current addition signal; a step of outputting a first M-axis voltage command value for use in canceling the deviation between the M-axis current actual value and the M-axis current command value based on the current addition signal and the M-axis current actual value; a step of obtaining a leakage inductance calculation value of the AC motor based on the AC signal and the M-axis current actual value; a step of multiplying the differential value of the current addition signal or the AC signal by the leakage inductance calculation value and obtaining a multiplication signal; a step of adding the first M-axis voltage command value and the multiplication signal to obtain a second M-axis voltage command value; a step of obtaining a T-axis voltage command value for use in canceling the deviation between the T-axis current command value and the T-axis current actual value; and a step of generating voltage command values for the AC motor based on the second M-axis voltage command value and the T-axis voltage command value.

The second variable-speed control method according to the present invention includes a step of obtaining an M-axis current actual value and a T-axis current actual value for the AC motor based on the detection value of the current provided for the AC motor; a step of generating an M-axis current command value and a T-axis current command value for the AC motor; a step of outputting an AC signal; a step of adding the T-axis current command value and the AC signal to output a current addition signal; a step of outputting a first T-axis voltage command value for use in canceling the deviation between the T-axis current actual value and the T-axis current command value based on the current addition signal and the T-axis current actual value; a step of obtaining a leakage inductance calculation value of the AC motor based on the AC signal and the T-axis current actual value; a step of multiplying the differential value of the current addition signal or the AC signal by the leakage inductance calculation value and obtaining a multiplication signal; a step of adding the first T-axis voltage command value and the multiplication signal to obtain a second T-axis voltage command value; a step of obtaining an M-axis voltage command value for use in canceling the deviation between the M-axis current command value and the M-axis current actual value; and a step of generating voltage command values for the AC motor based on the second T-axis voltage command value and the M-axis voltage command value. The power converter is controlled using the voltage command values, the AC motor is variable-speed-controlled, and the feedforward compensation can be performed for the voltage drop caused by the leakage inductance.

BRIEF DESCRIPTION OF THE DRAWINGS

FIG. 4 shows the waveforms of an input signal and an output signal of the first adder according to the first and second embodiments of the present invention;

FIG. 5 shows a configuration of the leakage inductance calculation circuit according to the first and second embodiments of the present invention;

FIG. 14 shows a configuration of the AC signal generation circuit according to the third and fourth embodiments of the present invention.

DESCRIPTION OF THE PREFERRED EMBODIMENT

Figure 2:
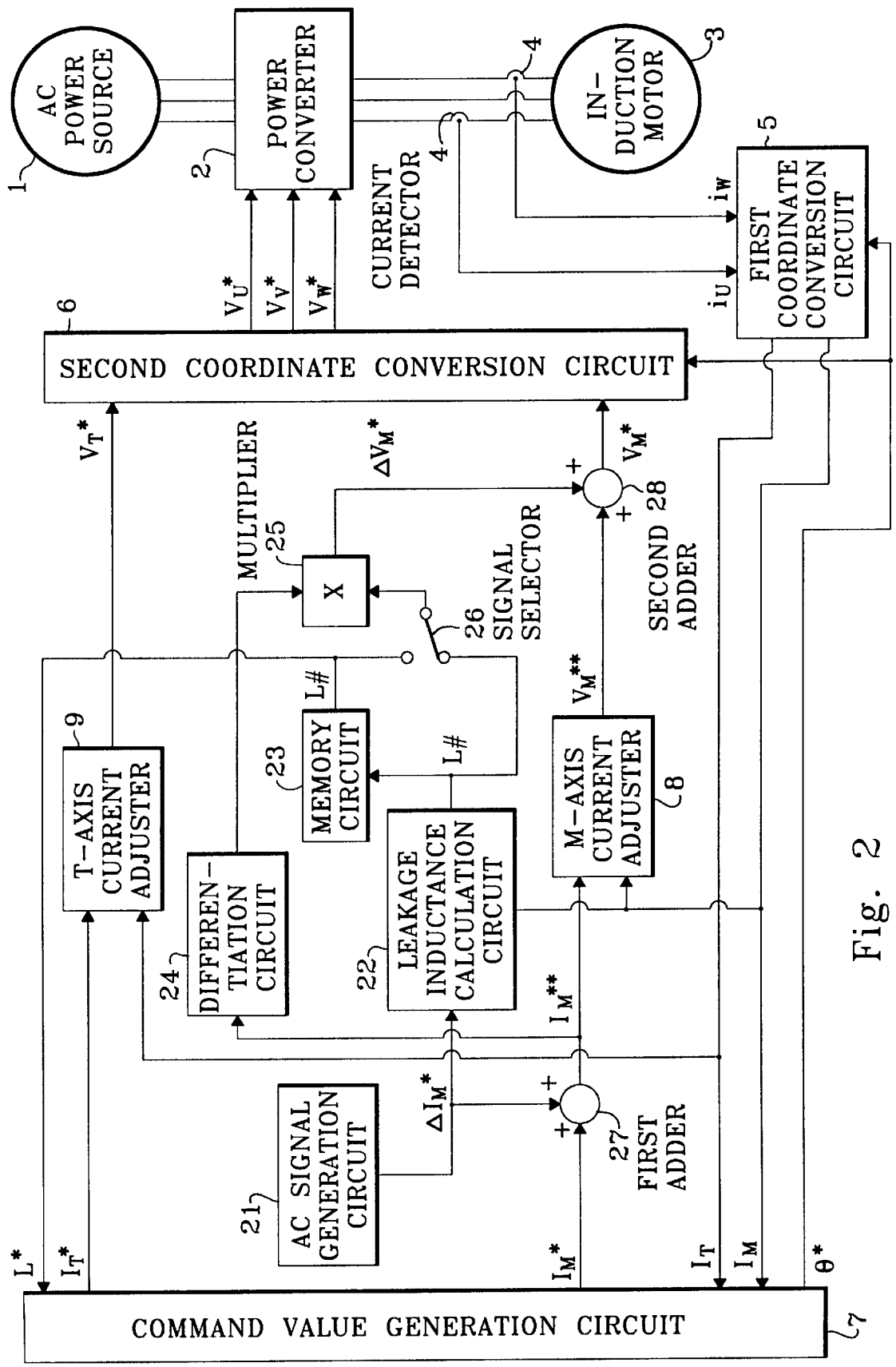
FIG. 2 is a block diagram showing the first embodiment of the variable-speed control apparatus according to the present invention.

FIG. 2 is a block diagram showing the first embodiment of the variable-speed control apparatus.

Figure 1:
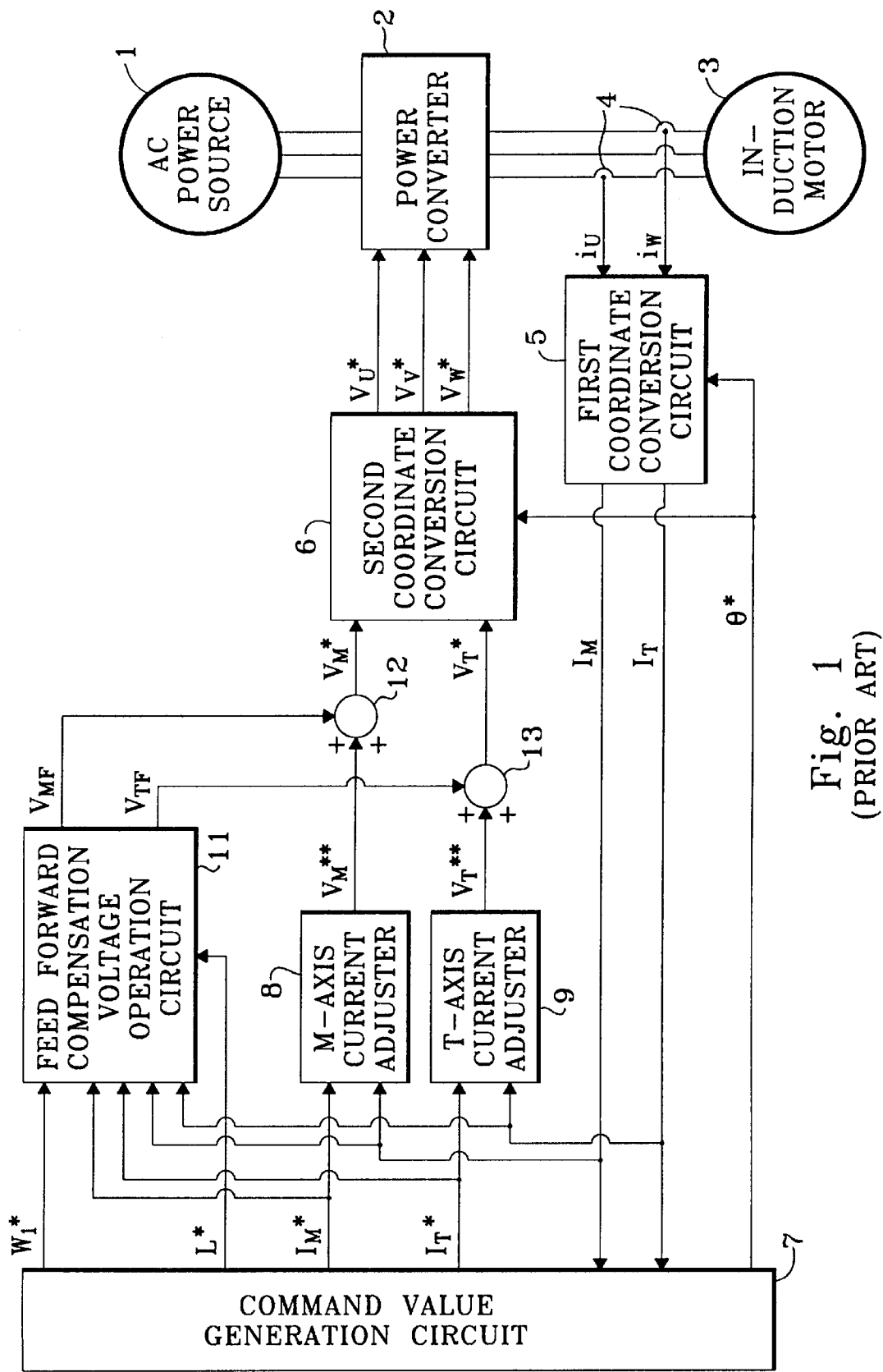
FIG. 1 is a block diagram showing an example of a conventional variable-speed control apparatus for an induction motor, for reducing the transient voltage through feedforward compensation.

The variable-speed control apparatus comprises the current detectors 4, the first coordinate conversion circuit 5, the second coordinate conversion circuit 6, the command value generation circuit 7, the M-axis current adjuster 8, the T-axis current adjuster 9, an AC signal generation circuit 21, a leakage inductance calculation circuit 22, a memory circuit 23, a differentiation circuit 24, a multiplier 25, a signal selector 26, a first adder 27, and a second adder 28. The functions of the AC power source 1, the power converter 2, the induction motor 3, the current detectors 4, the first coordinate conversion circuit 5, the second coordinate conversion circuit 6, the command value generation circuit 7, the M-axis current adjuster 8, and the T-axis current adjuster 9 shown in FIG. 2 are the same as the functions of items with the same numbers according to the conventional apparatus shown in FIG. 1. Therefore, the descriptions of the functions are omitted here. However, a leakage inductance calculation value L# is output from the leakage inductance calculation circuit 22, not from the command value generation circuit 7. The power converter 2 can be regarded as the component of the variable-speed control apparatus.

The AC signal generation circuit 21 outputs an AC signal $\Delta I_M^*$. The M-axis current command value $I_M^*$ output by the command value generation circuit 7 and this AC signal $\Delta I_M^*$ are input to the first adder 27. The M-axis current command value $I_M^{**}$ obtained by adding the AC signal after the adding process performed by the first adder 27 replaces the M-axis current command value $I_M^*$ and is input to the M-axis current adjuster 8 together with the M-axis current actual value $I_M$. The M-axis current adjuster 8 outputs an M-axis voltage command value (first M-axis voltage command value) $V_M^{**}$. The leakage inductance calculation circuit 22 inputs the AC signal $\Delta I_M^*$ and the M-axis current actual value $I_M$ to calculate and output the leakage inductance calculation value L#. The leakage inductance calculation value L# is also stored in the memory circuit 23. The signal selector 26 selects the leakage inductance calculation value L# output by the leakage inductance calculation circuit 22 before the induction motor 3 is operated, and selects and outputs the leakage inductance calculation value L#' stored in the memory circuit 23 when the induction motor 3 is operated. The signal selector 26 has the configuration in which signals are switched by contacts, but can also be designed for contactless switching.

The differentiation circuit 24 inputs the M-axis current command value $I_M^{}$ after the addition of the AC signal and outputs a differential operation value of the input command value $I_M^{}$, that is, the differential operation value of the AC signal $\Delta I_M^*$. The multiplier 25 outputs an M-axis voltage command value change $\Delta V_M^*$ (a voltage drop caused by the leakage inductance: refer to the following equation (5)) indicating a product of the differential operation value and the leakage inductance calculation value L# or L#' selected by the signal selector 26. The second adder 28 adds the output value $V_M^{**}$ from the M-axis current adjuster 8 and the M-axis voltage command value change $\Delta V_M^*$, and outputs the M-axis voltage command value (second M-axis voltage command value) $V_M^*$ to the second coordinate conversion circuit 6. The second coordinate conversion circuit 6 coordinate-converts the input T-axis voltage command value $V_T^*$ and M-axis voltage command value $V_M^*$ to generate 3-phase voltage command values ($v_u^*$, $v_v^*$, and $v_w^*$), and controls the power converter 2 using the command values.

The amplitude and the frequency of the AC signal $\Delta I_M^*$ output from the AC signal generation circuit 21 can be determined based on, for example, the rating current and the cut-off frequency of the secondary circuit of the induction motor 3. If the current provided to the induction motor 3 is 30 A, the amplitude of the AC signal is set to be, for example, about 10% of the current (9–10 A). If the cut-off frequency of the secondary circuit of the induction motor 3 is 200 Hz, the frequency of the AC signal $\Delta I_M^*$ is set to be less than 200 Hz, which is, for example, 100 Hz.

Figure 3:
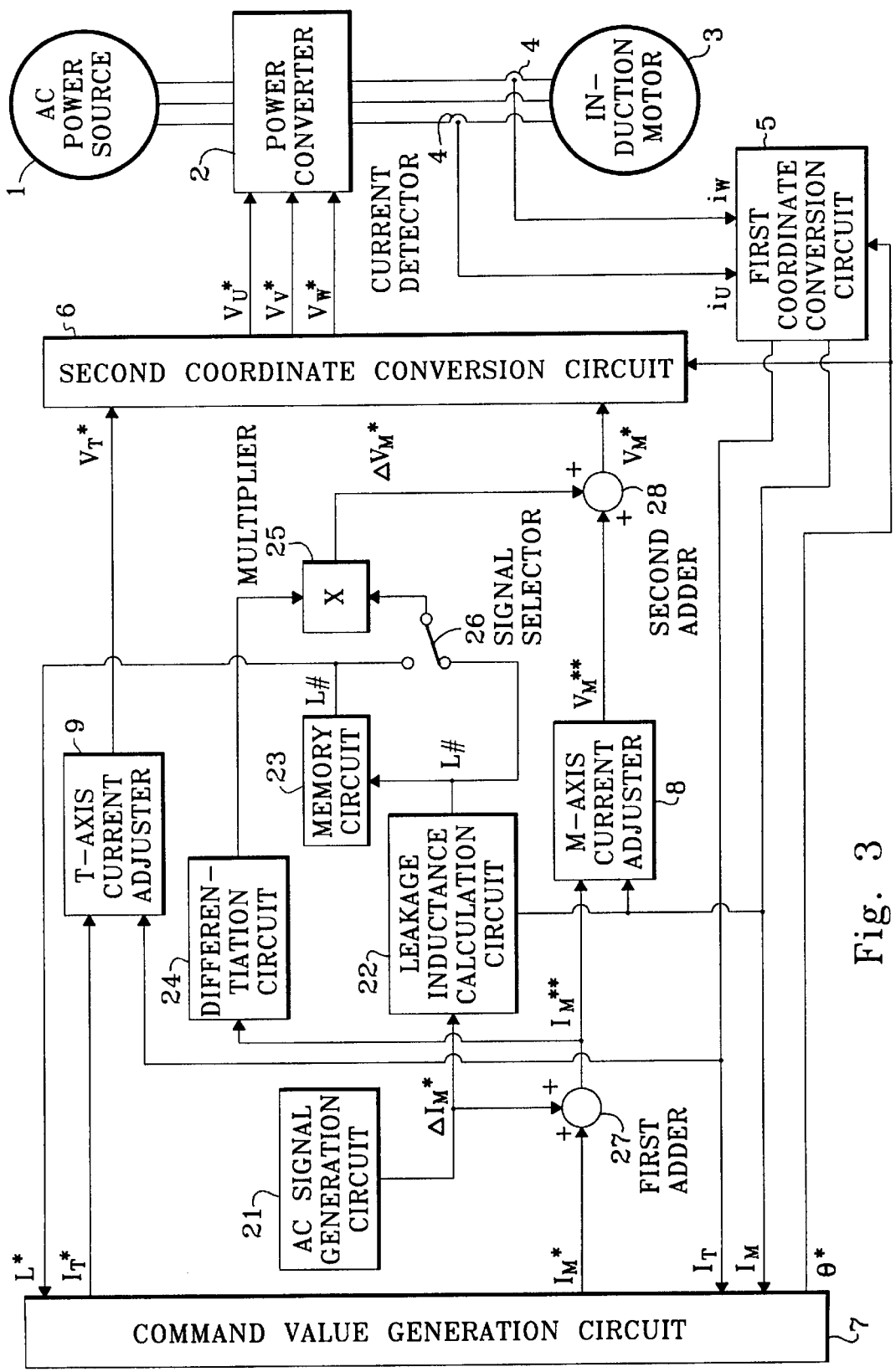
FIG. 3 is a block diagram showing the second embodiment of the variable-speed control apparatus according to the present invention.

FIG. 3 shows the configuration according to the second embodiment of the variable-speed control apparatus of the present invention.

This variable-speed control apparatus is a variation of the first embodiment shown in FIG. 2, and is different from the first embodiment in that the AC signal $\Delta I_M^*$ is input to the differentiation circuit 24. Otherwise, it is the same as the first embodiment, and the detailed explanation is omitted here.

The differentiation circuit 24 according to the second embodiment differentiates the AC signal $\Delta I_M^*$, and the differentiation result is multiplied by the leakage inductance calculation value L# or L#' by the multiplier 25. As a result, the M-axis voltage command value $V_M^*$ represented in the following equation (5) is obtained.

FIG. 4 shows the waveforms of the signals input to the first adder 27 (the M-axis current command value $I_M^*$ and the AC signal $\Delta I_M^*$) and the signal output therefrom (M-axis current command value $I_M^{**}$). (1) in FIG. 4 indicates the waveform of the M-axis current command value $I_M^*$ input to the first adder 27. (2) indicates the waveform of the AC signal $\Delta I_M^*$ input to the first adder 27. (3) indicates the waveform of the M-axis current command value $I_M^{}$ after the addition of the AC signal, output from the first adder 27. The M-axis current command value $I_M^{}$ after the addition of the AC signal is obtained by adding the M-axis current command value $I_M^*$, which is a direct current, to the AC signal $\Delta I_M^*$. Therefore, the differentiation of the M-axis current command value $I_M^{**}$ after the addition of the AC signal outputs the same result as the differentiation of the AC signal $\Delta I_M^*$. Therefore, inputting to the differentiation circuit 24 the M-axis current command value $I_M^{**}$ after the addition of the AC signal (according to the first embodiment) outputs the same result as inputting the AC signal $\Delta I_M^*$ (according to the second embodiment).

Described below is the function of the leakage inductance calculation circuit 22.

The M-axis voltage command value change $\Delta V_M^*$ output from the multiplier 25 is a product of the differential value of the AC signal $\Delta I_M^*$ and the leakage inductance calculation value L# output from the leakage inductance calculation circuit 22. Therefore, the M-axis voltage command value change $\Delta V_M^*$ is represented by the following equation where p indicates a differential operator.

$$\Delta V_M^* = p \cdot L\# \cdot \Delta I_M^* \qquad (5)$$

When the voltage command value matches the actual voltage value in the drive of an AC motor by a voltage-dependent power converter, the following equation (6) holds.

$$\Delta V_M^* = p \cdot L \cdot \Delta I_M \qquad (6)$$

where $\Delta I_M$ indicates an M-axis current actual value change, and L indicates a leakage inductance actual value. Equation (7) is obtained from equations (5) and (6).

$$p \cdot L\# \cdot \Delta I_M^* = p \cdot L \cdot \Delta I_M \qquad (7)$$

If an operation circuit for adjusting the leakage inductance calculation value L# is provided in a way that the M-axis current actual value change $\Delta I_M$ matches the AC signal $\Delta I_M^*$, the leakage inductance calculation value L# can match the leakage inductance actual value L. The following equation (8) is obtained according to the amplitude information obtained in the absolute value operation of the AC signal $\Delta I_M^*$ and the amplitude information obtained in the absolute operation of the M-axis current actual value $I_M$. Equation (8) can be converted into the following equations (9) and (10).

$$p \cdot L\# \cdot |\Delta I_M^*| = p \cdot L \cdot |\Delta I_M| \qquad (8)$$

$$|\Delta I_M| = (L\#/L) \cdot |\Delta I_M^*| \qquad (9)$$

$$|\Delta I_M^*| - |\Delta I_M| = |\Delta I_M^*| \cdot (1 - L\#/L) \qquad (10)$$

If L# is larger than L, equation (10) outputs a negative value. If L# is smaller than L, equation (10) outputs a positive value. As indicated by equation (10), the leakage inductance calculation value L# is obtained by performing an integral operation or a proportional-plus-integral operation using the difference between the absolute value of $\Delta I_M{}^*$ and the absolute value of $\Delta I_M$ as an error signal, and the leakage inductance calculation value L# converges into an actual value L.

FIG. 5 shows the configuration of the leakage inductance calculation circuit 22 according to the first and second embodiments of the present invention.

As shown in FIG. 5, the leakage inductance calculation circuit 22 comprises a first amplitude calculation circuit 31, a second amplitude calculation circuit 32, a third adder (or subtracter) 33, and an adjustment circuit 34. The AC signal $\Delta I_M{}^*$ is input to the first amplitude calculation circuit 31 comprising an absolute value operation circuit which obtains the absolute value of the AC signal $\Delta I_M{}^*$. The second amplitude calculation circuit 32 receives the M-axis current actual value $I_M$ and obtains its absolute value. The third adder 33 subtracts (performs an operation using equation (10)) the absolute value of the M-axis current actual value $I_M$ from the absolute value of the AC signal $\Delta I_M{}^*$. The difference is input to the adjustment circuit 34 comprising an integral operation unit or a proportional-plus-integral operation unit. The adjustment circuit 34 outputs a leakage inductance calculation value L# equal to the leakage inductance actual value L.

If a delay time t exists due to the pulse width modulation control by the power converter 2 or a sampling delay when the electric current is detected, then equation (7) can be expressed by the following equation (11).

$$p \cdot L \cdot \Delta I_M = \epsilon^{-st} \cdot p \cdot L\# \cdot \Delta I_M{}^* \qquad (11)$$

In this case, if the average value of the absolute value of the M-axis current actual value $I_M$ is represented by $|I_M|_{AV}$, and the average value of the absolute value of the M-axis current command value $I_M{}^*$ is represented by $|I_M{}^*|_{AV}$, the correlation between these values is represented by the following equation (12).

$$|\Delta I_M|_{AV} = (L\#/L) \cdot |\Delta I_M{}^*|_{AV} \qquad (12)$$

Since equation (12) does not contain $\epsilon^{-st}$ indicating the influence of the delay time t, the operation of obtaining the leakage inductance calculation value L# can be performed using the above described absolute values without the influence of the delay time t.

Figure 6:
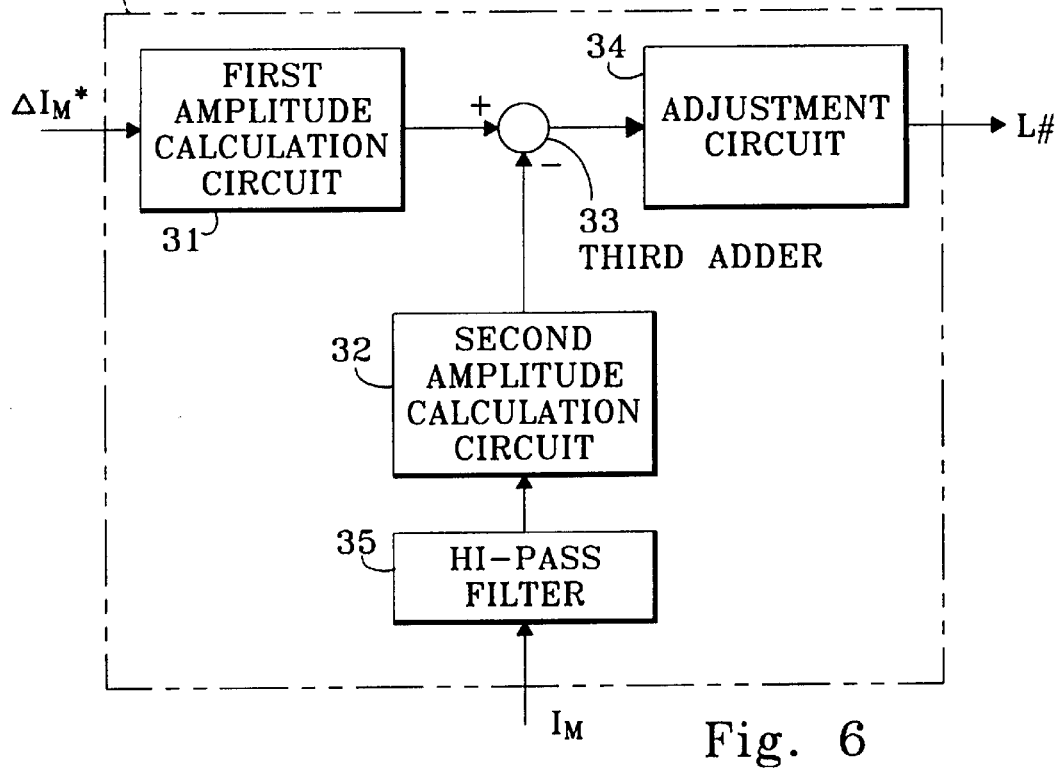
FIG. 6 shows a second configuration of the leakage inductance calculation circuit according to the first and second embodiments of the present invention.

FIG. 6 shows the second example of the configuration of the leakage inductance calculation circuit 22 according to the present invention.

The leakage inductance calculation circuit 22 is configured by adding a high-pass filter 35 as shown in FIG. 6 to the leakage inductance calculation circuit shown in FIG. 5. The configuration of the first amplitude calculation circuit 31, the second amplitude calculation circuit 32, the third adder 33, and the adjustment circuit 34 is the same as the configuration shown in FIG. 5. If a direct current element or a low frequency element is contained in the M-axis current actual value $I_M$ input to the leakage inductance calculation circuit 22, and is input as it is to the second amplitude calculation circuit 32, then correct amplitude information about a change cannot be obtained. Therefore, in this example, the high-pass filter 35 is added to the stage prior to the second amplitude calculation circuit 32 to remove the above described low frequency element.

A filter having the same function as the high-pass filter 35 can also be added to the stage prior to the first amplitude calculation circuit 31. The M-axis current command value $I_M{}^{**}$ after the addition of the AC signal output from the first adder 27 can replace the AC signal $\Delta I_M{}^*$ and can be input to the first amplitude calculation circuit 31.

Figure 7:
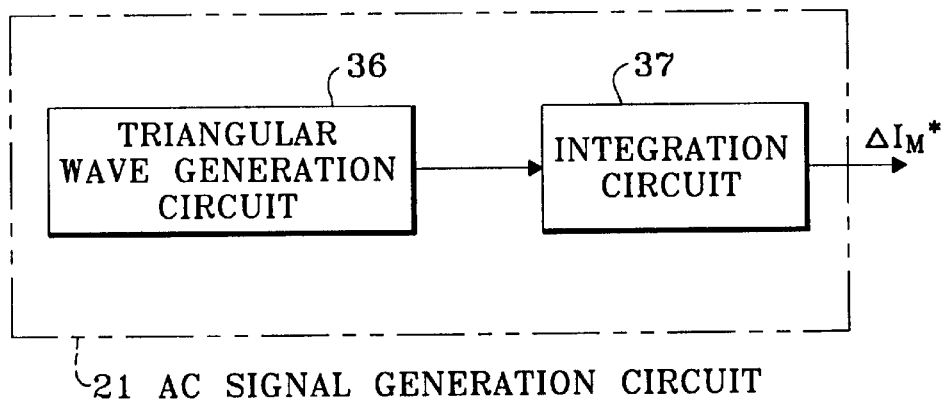
FIG. 7 shows a configuration of the AC signal generation circuit according to the first and second embodiments of the present invention.

FIG. 7 shows an example of the configuration of the AC signal generation circuit 21 according to the present invention.

The AC signal generation circuit 21 comprises a triangular wave generation circuit 36 and an integration circuit 37, and outputs an integrated wave of the triangular wave as the AC signal $\Delta I_M{}^*$. Since the first adder 27 adds the AC signal $\Delta I_M{}^*$ to the M-axis current command value $I_M{}^*$, the M-axis voltage command value $V_M{}^*$ is also a triangular wave. Thus, the quantization error can be reduced by setting the voltage command value as a triangular wave. The AC signal generation circuit 21 can also output an AC signal as a sine wave.

Figure 8:
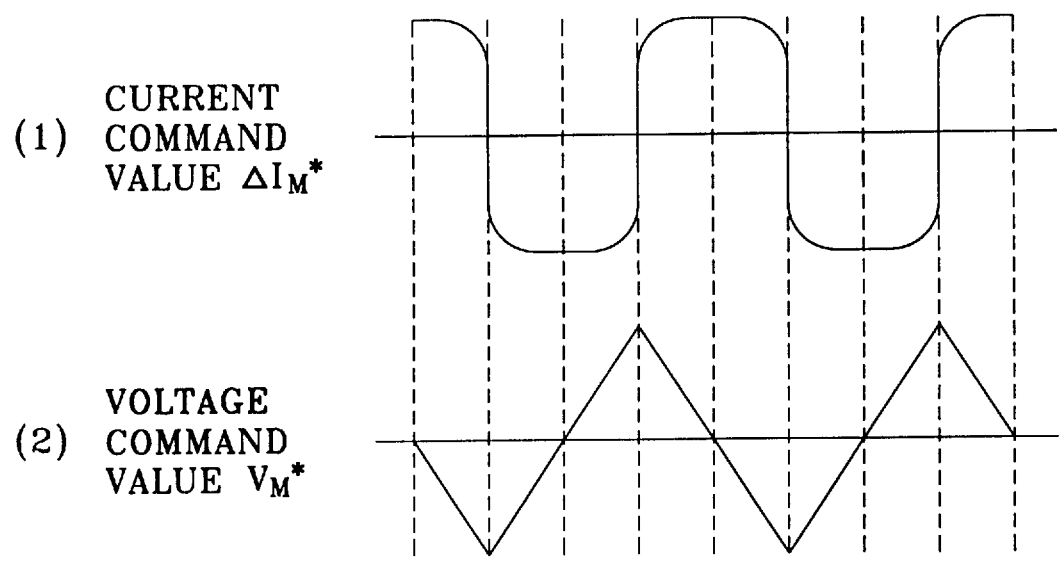
FIG. 8 shows the waveform indicating the effect of the AC signal generation circuit according to the first and second embodiments of the present invention.

FIG. 8 shows waveforms indicating the effect of the AC signal generation circuit 21 shown in FIG. 7. In FIG. 8, (1) indicates the waveform of the AC signal $\Delta I_M{}^*$, and (2) indicates the waveform of the M-axis voltage command value $V_M{}^*$.

Figure 9:
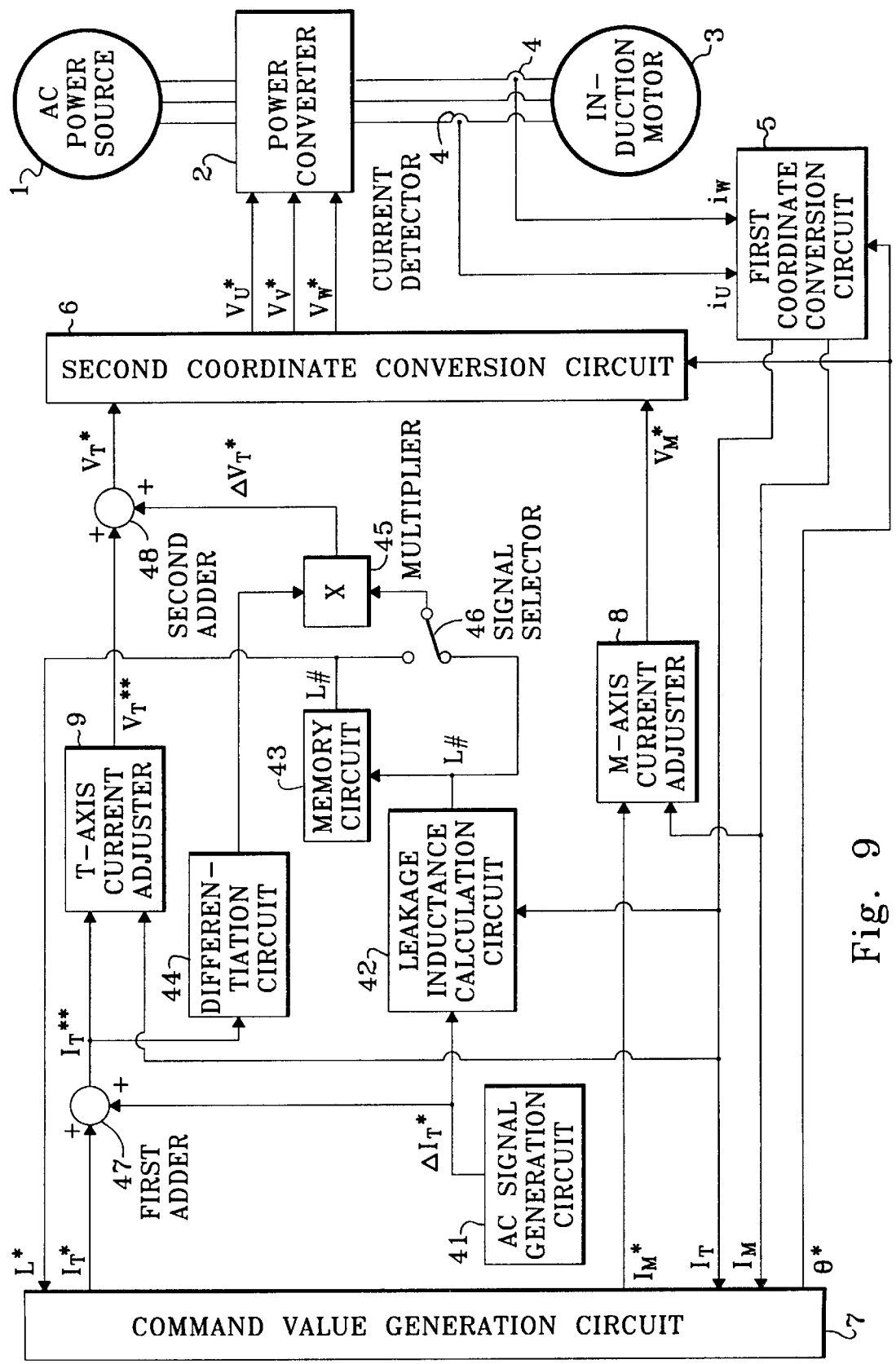
FIG. 9 is a block diagram showing the third embodiment of the variable-speed control apparatus according to the present invention.

FIG. 9 shows the third embodiment of the variable-speed control apparatus according to the present invention.

This variable-speed control apparatus comprises the current detectors 4, the first coordinate conversion circuit 5, the second coordinate conversion circuit 6, the command value generation circuit 7, the M-axis current adjuster 8, the T-axis current adjuster 9, an AC signal generation circuit 41, a leakage inductance calculation circuit 42, a memory circuit 43, a differentiation circuit 44, a multiplier 45, a signal selector 46, a first adder 47, and a second adder 48. The functions of the AC power source 1, the power converter 2, the induction motor 3, the current detectors 4, the first coordinate conversion circuit 5, the second coordinate conversion circuit 6, the command value generation circuit 7, the M-axis current adjuster 8, and the T-axis current adjuster 9 shown in FIG. 9, are the same as those of the conventional technology shown in FIG. 1. Therefore, the detailed explanation of these functions is omitted here. However, the leakage inductance calculation value L# is output from the leakage inductance calculation circuit 42, not from the command value generation circuit 7.

The AC signal generation circuit 41 outputs an AC signal $\Delta I_T{}^*$, and the T-axis current command value $I_T{}^*$ output from the command value generation circuit 7 and the AC signal $\Delta I_T{}^*$ are input to the first adder 47. The T-axis current command value $I_T{}^{}$ after the addition of the AC signal obtained in the adding process by the first adder 47 is input to the T-axis current adjuster 9 together with the T-axis current actual value $I_T$, and the T-axis current adjuster 9 outputs the T-axis voltage command value $V_T{}^{}$. The leakage inductance calculation circuit 42 receives the above described AC signal $\Delta I_T{}^*$ and the T-axis current actual value $I_T$, and calculates and outputs the leakage inductance calculation value L#. The leakage inductance calculation value L# is also stored in the memory circuit 43. The signal selector 46 selects the leakage inductance calculation value L# output from the leakage inductance calculation circuit 42 before the induction motor 3 is operated, and selects and outputs the leakage inductance calculation value L#' stored in the memory circuit 43 if the induction motor 3 is being operated. The signal selector 46 is shown as switching signals by contacts, but can also be designed for contactless switching.

The differentiation circuit 44 receives the T-axis current command value $I_T{}^{}$ after the addition of the AC signal and outputs the differential value of the input T-axis current command value $I_T^{}$, that is, the differential operation value of the AC signal $\Delta I_T^*$. The multiplier 45 computes a T-axis voltage command value change $\Delta V_T^*$ (a voltage drop caused by the leakage inductance: refer to the following equation (13)) indicating a product of the differential operation value and the leakage inductance calculation value $L\#$ or $L\#'$ selected by the signal selector 46. The second adder 48 adds the output value $V_T^{}$ from the T-axis current adjuster 9** and the T-axis voltage command value change $\Delta V_T^*$, and outputs the T-axis voltage command value $V_T^*$ to the second coordinate conversion circuit 6.

Figure 10:
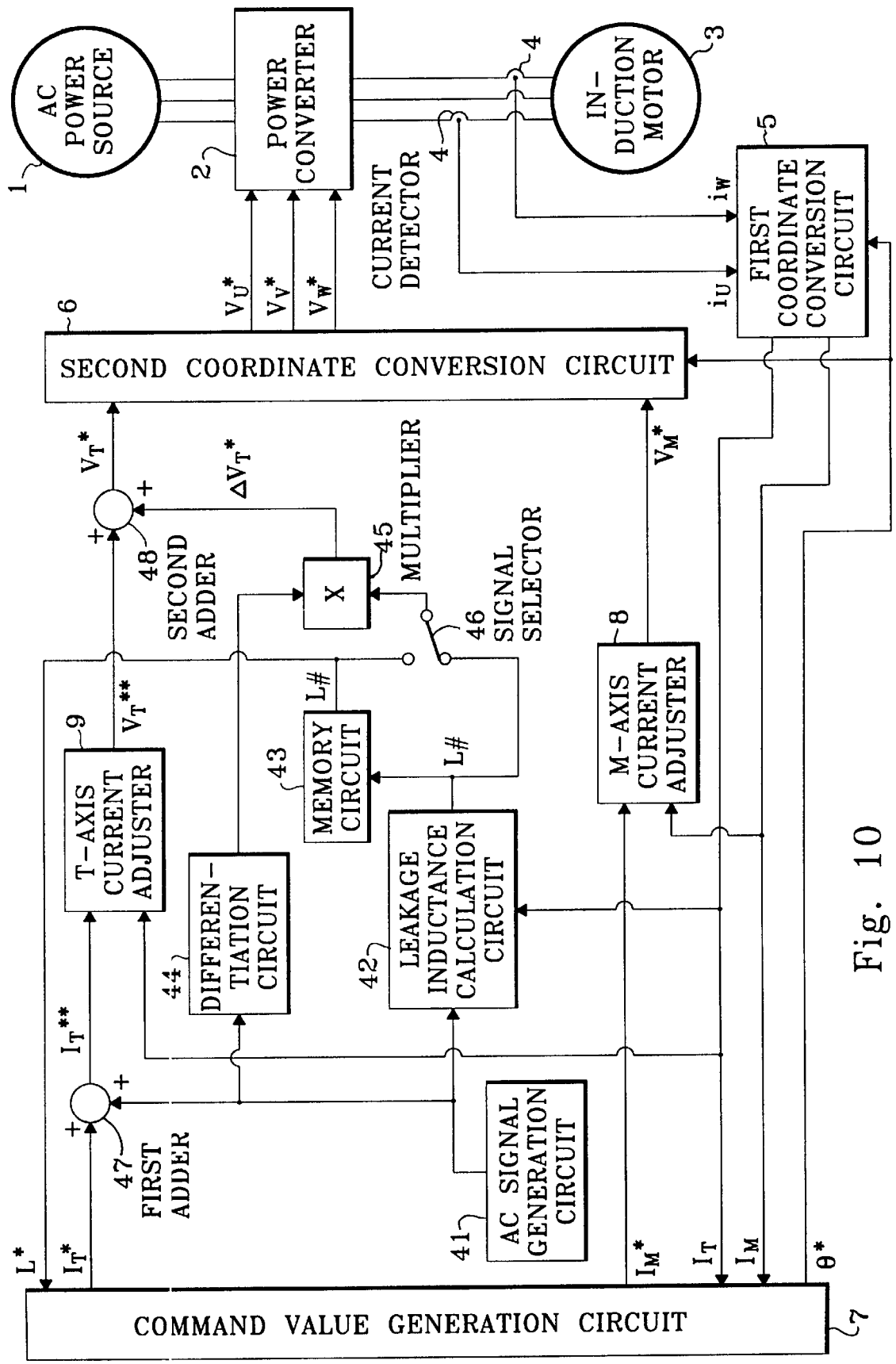
FIG. 10 is a block diagram showing the fourth embodiment of the variable-speed control apparatus according to the present invention.

FIG. 10 shows the configuration according to the fourth embodiment of the variable-speed control apparatus of the present invention.

The variable-speed control apparatus is a variation of the third embodiment shown in FIG. 9, but is different from the third embodiment in that the AC signal $\Delta I_T^*$ is input to the differentiation circuit 44. Otherwise, it is the same as the third embodiment, and the detailed explanation is omitted here.

The differentiation circuit 44 according to the fourth embodiment differentiates the AC signal $\Delta I_T^*$, and the differentiation result is multiplied by the leakage inductance calculation value $L\#$ or $L\#'$ by the multiplier 45. As a result, the T-axis voltage command value $V_T^*$ represented in the following equation (13) is obtained.

Figure 11:
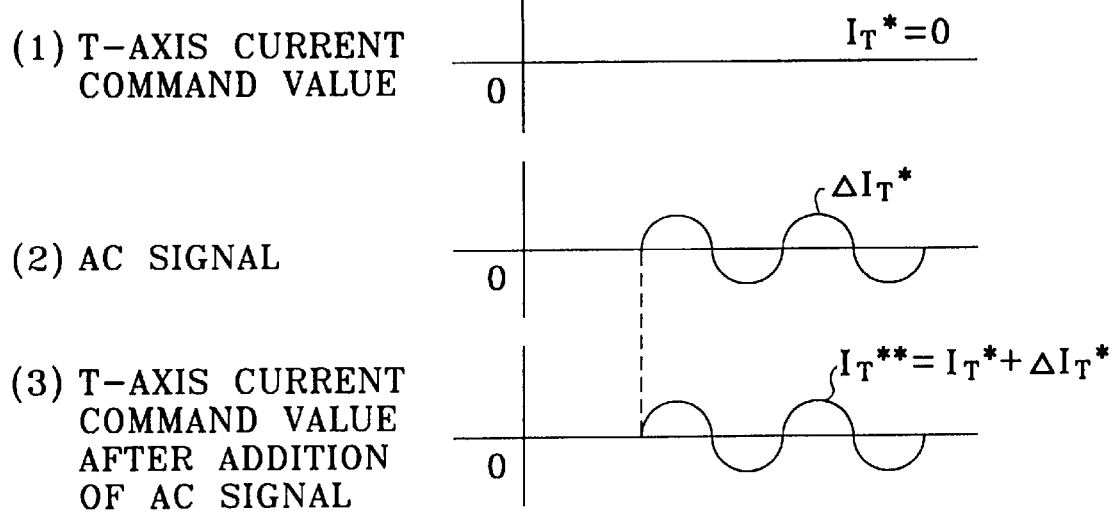
FIG. 11 shows the waveforms of an input signal and an output signal of the first adder according to the third and fourth embodiments of the present invention.

FIG. 11 shows the waveforms of the input and output signals of the first adder 47. (1) in FIG. 11 indicates the waveform of the T-axis current command value $I_T^*$ input to the first adder 47. (2) indicates the waveform of the AC signal $\Delta I_T^*$ input to the first adder 47. (3) indicates the waveform of the T-axis current command value $I_T^{}$ after the addition of the AC signal output from the first adder 47**.

Before the induction motor 3 starts its operation, the T-axis current command value $I_T^*$ output from the first adder 47 is zero (refer to (1) shown in FIG. 11). Therefore, the T-axis current command value $I_T^{}$ after the addition of the AC signal output from the first adder 47** is identical to the AC signal $\Delta I_T^*$, and the differentiation result of the T-axis current command value $I_T^{**}$ after the addition of the AC signal matches the differentiation result of the AC signal $\Delta I_T^*$. Therefore, inputting the T-axis current command value $I_T^{}$ after the addition of the AC signal to the differentiation circuit 44 (corresponding to the third embodiment shown in FIG. 9**) outputs the same result as inputting the AC signal $\Delta I_T^*$ (corresponding to the fourth embodiment shown in FIG. 10).

The amplitude of the AC signal $\Delta I_T^*$ can be set to be, for example, 80% of the current value provided to the induction motor 3, which is larger than the amplitude set in the first or second embodiment. In addition, there is no bias in the current command value. Therefore, leakage inductance compensation with high degree of accuracy can be realized according to this embodiment.

Described below is the function of the leakage inductance calculation circuit 42.

The T-axis voltage command value change $\Delta V_T^*$ output from the multiplier 45 is a product of the differential value of the AC signal $\Delta I_T^*$ and the leakage inductance calculation value $L\#$ output from the leakage inductance calculation circuit 42. Therefore, the T-axis voltage command value change $\Delta V_T^*$ is represented by the following equation (13) where p indicates a differential operator.

$$\Delta V_T^* = p \cdot L\# \cdot \Delta I_T^* \tag{13}$$

When the voltage command value matches the actual voltage value in the drive of an AC motor by a voltage-dependent power converter, the following equation (14) holds.

$$\Delta V_T^* = p \cdot L \cdot \Delta I_T \tag{14}$$

where $\Delta I_T$ indicates a T-axis current actual value change, and L indicates a leakage inductance actual value.

Equation (15) is obtained from equations (13) and (14).

$$p \cdot L\# \cdot \Delta I_T^* = p \cdot L \cdot \Delta I_T \tag{15}$$

If an operation circuit for adjusting the leakage inductance calculation value $L\#$ is provided in a way that the T-axis current actual value change $\Delta I_T$ matches the AC signal $\Delta I_T^*$, the leakage inductance calculation value $L\#$ can match the leakage inductance actual value L. The following equation (16) is obtained according to the amplitude information obtained in the absolute value operation of the AC signal $\Delta I_T^*$ and the amplitude information obtained in the absolute operation of the T-axis current actual value $I_T$. Equation (16) can be converted into the following equations (17) and (18).

$$p \cdot L\# \cdot |\Delta I_T^*| = p \cdot L \cdot |\Delta I_T| \tag{16}$$

$$|\Delta I_T| = (L\#/L) \cdot |\Delta I_T^*| \tag{17}$$

$$|\Delta I_T^*| - |\Delta I_T| = |\Delta I_T^*|(1 - L\#/L) \tag{18}$$

If $L\#$ is larger than L, equation (18) outputs a negative value. If $L\#$ is smaller than L, equation (18) outputs a positive value. As indicated by equation (18), the leakage inductance calculation value $L\#$ is obtained by performing an integration operation or a proportional-plus-integral operation using the difference between the absolute value of $\Delta I_T^*$ and the absolute value of $\Delta I_T$ as an error signal, and the leakage inductance calculation value $L\#$ converges into an actual value L.

Figure 12:
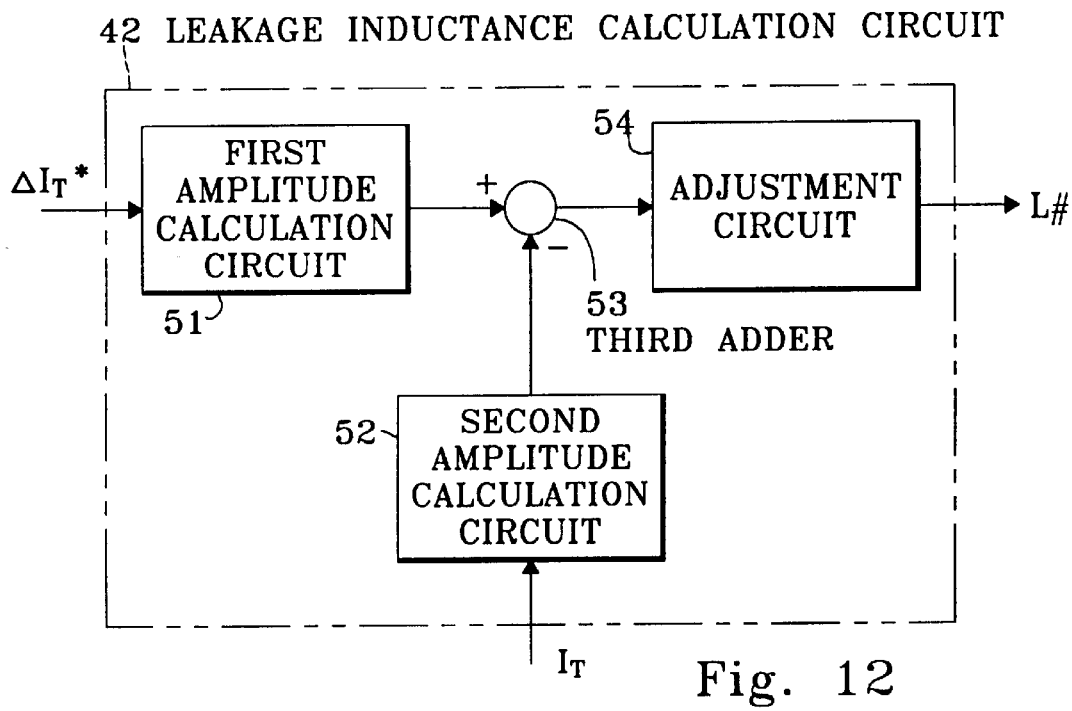
FIG. 12 shows a configuration of the leakage inductance calculation circuit according to the third and fourth embodiments of the present invention.

FIG. 12 shows the configuration of the leakage inductance calculation circuit 42 according to the third and fourth embodiments of the present invention.

As shown in FIG. 12, the leakage inductance calculation circuit 42 comprises a first amplitude calculation circuit 51, a second amplitude calculation circuit 52, a third adder (or subtracter) 53, and an adjustment circuit 54. The AC signal $\Delta I_T^*$ is input to the first amplitude calculation circuit 51 comprising an absolute value operation circuit which obtains the absolute value of the AC signal $\Delta I_T^*$. The second amplitude calculation circuit 52 receives the T-axis current actual value $I_T$ and obtains its absolute value. The third adder 53 subtracts (performs an operation using equation (18)) the absolute value of the T-axis current actual value $I_T$ from the absolute value of the AC signal $\Delta I_T^*$. The difference is input to the adjustment circuit 54 comprising an integral operation unit or a proportional-plus-integral operation unit. The adjustment circuit 54 outputs a leakage inductance calculation value $L\#$ equal to the leakage inductance actual value L.

If delay time t exists due to the pulse width modulation control by the power converter 2 or a sampling delay when the electric current is detected, then equation (15) can be expressed by the following equation (19).

$$p \cdot L \cdot \Delta I_T = \epsilon^{-st} \cdot p \cdot L\# \cdot \Delta I_T^* \tag{19}$$

In this case, if the average value of the absolute value of the T-axis current actual value $I_T$ is represented by $|I_T|_{AV}$, and the average value of the absolute value of the T-axis current command value $I_T^*$ is represented by $|I_T^*|_{AV}$, the correlation between these values is represented by the following equation (20).

$$|\Delta I_T|_{AV} = (L\#/L) \cdot |\Delta I_T^*|_{AV} \tag{20}$$

Since equation (20) does not contain $\epsilon^{-st}$ indicating the influence of the delay time t, the operation of the leakage inductance calculation value L# can be performed using the above described absolute values without the influence of the delay time t.

Figure 13:
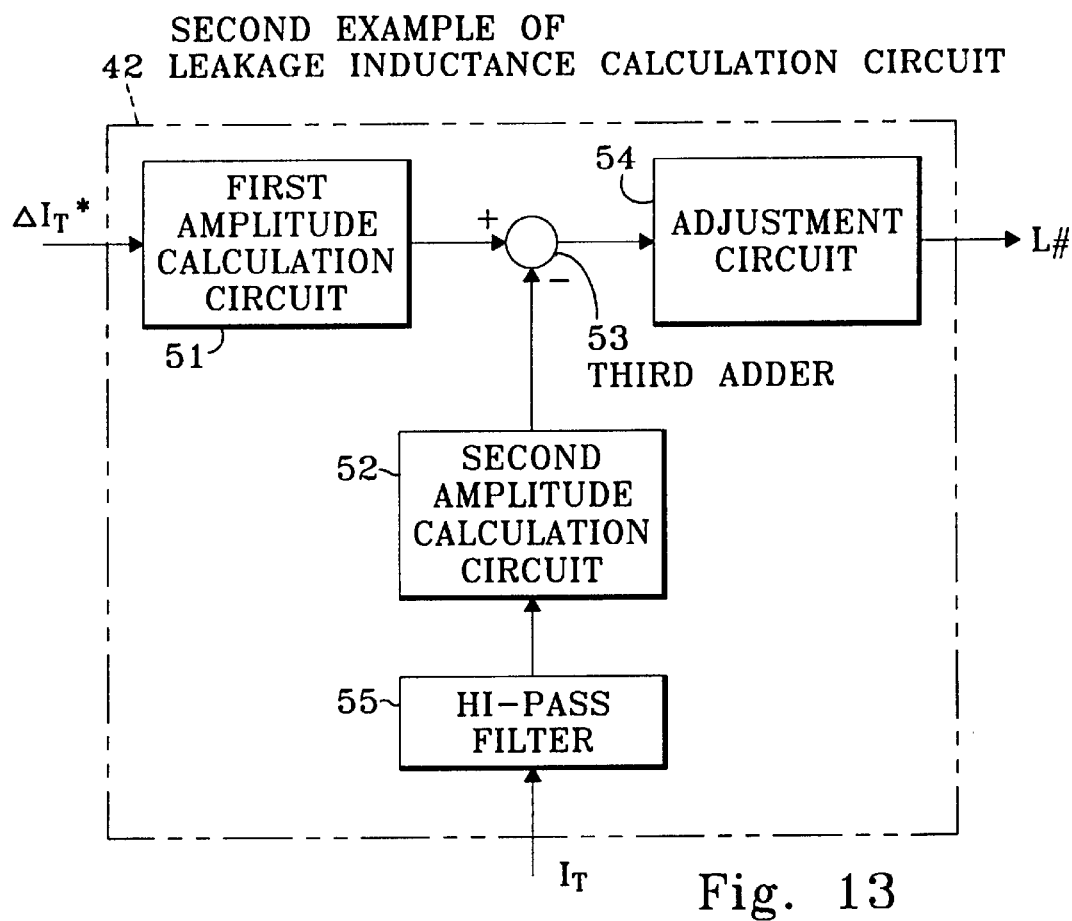
FIG. 13 shows a second configuration of the leakage inductance calculation circuit according to the third and fourth embodiments of the present invention.

FIG. 13 shows the second example of the configuration of the leakage inductance calculation circuit 42 according to the third and fourth embodiments of the present invention.

The leakage inductance calculation circuit is configured by adding a high-pass filter 55 as shown in FIG. 13 to the leakage inductance circuit 42 as shown in FIG. 12. The configuration of the first amplitude calculation circuit 51, the second amplitude calculation circuit 52, the third adder 53, and the adjustment circuit 54 is the same as the configuration shown in FIG. 12. If a direct current element or a low frequency element is contained in the T-axis current actual value $I_T$ input to the leakage inductance calculation circuit 42, and is input as it is to the second amplitude calculation circuit 52, then correct amplitude information about a change cannot be obtained. Therefore, in this example, the high-pass filter 55 is added to the stage prior to the second amplitude calculation circuit 52 to remove the above described low frequency element.

A filter having the same function as the high-pass filter 55 can be added to the stage prior to the first amplitude calculation circuit 51. The T-axis current command value $I_T^{**}$ after the addition of the AC signal output from the first adder 47 can replace the AC signal $\Delta I_T^*$ and can be input to the first amplitude calculation circuit 51.

FIG. 14 shows an example of the configuration of the AC signal generation circuit 41 according to the third and fourth embodiments of the present invention.

The AC signal generation circuit 41 comprises a triangular wave generation circuit 56 and an integration circuit 57, and outputs an integrated wave of the triangular wave as the AC signal $\Delta I_T^*$. Since the first adder 47 adds the AC signal $\Delta I_T^*$ to the T-axis current command value $I_T^*$, the T-axis voltage command value $V_T^*$ is also a triangular wave. Thus, the quantization error can be reduced by setting the voltage command value as a triangular wave. The waveform of the AC signal $\Delta I_T^*$ and the waveform of the T-axis voltage command value $V_T^*$ are identical to the waveforms indicated by (1) and (2) respectively shown in FIG. 8. The AC signal generation circuit 41 can also output an AC signal as a sine wave.

According to the present invention, the feedforward compensation and induction voltage operations in controlling an electric current can be performed using the leakage inductance calculation value computed before operating the AC motor. Therefore, a control and a calculation according to the torque and the magnetic flux of the AC motor can be appropriately performed even if the length of the electric line connecting the AC motor is altered or the leakage inductance value changes by rewinding the AC motor or by exchanging the motor.

Furthermore, according to the present invention, the leakage inductance can be identified by comparing the amplitude values of the M-axis or T-axis current command value to which an AC signal is added and the M-axis or T-axis current actual value. Therefore, the leakage inductance can be obtained without the influence of a delay time in controlling the electric current, thereby performing correct variable-speed control with the influence taken into account.

Even if a direct current element such as an offset is superposed to an M-axis or T-axis current actual value, the direct current element is removed using a high-pass filter, thereby correctly performing a leakage inductance compensating operation.

Furthermore, according to the present invention, a leakage inductance can be identified using the integrated waveform of a triangular wave as an AC signal added to a current command value. Thus, a voltage command value becomes a triangular wave, a quantization error can be reduced, and the leakage inductance can be identified without giving excess load to the power converter.

Additionally, since there is no direct bias in the T-axis current command value according to the present invention, the leakage inductance can be identified without the influence of magnetic saturation.

What is claimed is:

1. A variable-speed control apparatus for controlling a variable speed of an AC motor by adjusting an electric current provided to the AC motor through a power converter, comprising:

first coordinate conversion means for obtaining an M-axis current actual value and a T-axis current actual value for the AC motor based on a detection value of the electric current provided for the AC motor;

command value generation means for generating an M-axis current command value and a T-axis current command value for the AC motor;

AC signal generation means for outputting an AC signal;

first addition means for adding the M-axis current command value and the AC signal, and outputting a current addition signal;

M-axis current adjustment means for outputting a first M-axis voltage command value used to cancel a deviation between the M-axis current actual value and the M-axis current command value, based on the current addition signal and the M-axis current actual value;

leakage inductance calculation means for obtaining a leakage inductance calculation value of the AC motor based on the AC signal and the M-axis current actual value;

multiplication means for multiplying a differential value of one of the current addition signal and the AC signal by the leakage inductance calculation value and outputting a multiplication signal;

second addition means for adding the first M-axis voltage command value and the multiplication signal and outputting a second M-axis voltage command value;

T-axis current adjustment means for outputting a T-axis voltage command value used to cancel a deviation between the T-axis current command value and the T-axis current actual value; and second coordinate conversion means for generating voltage command values for the AC motor based on the second M-axis voltage command value and the T-axis voltage command value, and outputting the generated voltage command values to the power converter.

2. The variable-speed control apparatus according to claim 1, wherein said leakage inductance calculation means comprises:

first amplitude calculation means for obtaining and outputting an amplitude of the AC signal;

second amplitude calculation means for obtaining and outputting an amplitude of the M-axis current actual value;

third addition means for subtracting an output of said second amplitude calculation means from an output of said first amplitude calculation means, and outputting a subtraction result; and adjustment means for performing one of an integral operation and a proportional-plus-integral operation on an output of said third addition means, and obtaining the leakage inductance calculation value.

3. The variable-speed control apparatus according to claim 2, wherein
said leakage inductance calculation means further comprises filter means for selectively removing an component of a frequency lower than a frequency of the M-axis current actual value from a signal to be input to said second amplitude calculation means.

4. The variable-speed control apparatus according to claim 1, wherein said AC signal generation means comprises:
triangular wave generation means for outputting a triangular wave; and
integration means for integrating the triangular wave and outputting an integrated result as the AC signal.

5. The variable-speed control apparatus according to claim 1, further comprising:
memory means for storing a leakage inductance calculation value obtained by said leakage inductance calculation means, wherein
said multiplication means multiplies a leakage inductance calculation value stored in said memory means by a differential value of the AC signal and obtains the multiplication signal.

6. The variable-speed control apparatus according to claim 5, further comprising:
signal selection means for selectively outputting one of an output from said leakage inductance calculation means and an output from said memory means to said multiplication means.

7. The variable-speed control apparatus according to claim 6, wherein
said signal selection means selects the output from said leakage inductance calculation means when the AC motor is not operated, and selects the output from said memory means while the AC motor is being operated.

8. A variable-speed control apparatus for controlling a variable speed of an AC motor by adjusting an electric current provided to the AC motor through a power converter, comprising:
first coordinate conversion means for obtaining an M-axis current actual value and a T-axis current actual value for the AC motor based on a detection value of the electric current provided for the AC motor;
command value generation means for generating an M-axis current command value and a T-axis current command value for the AC motor;
AC signal generation means for outputting an AC signal;
first addition means for adding the T-axis current command value and the AC signal, and outputting a current addition signal;
T-axis current adjustment means for outputting a first T-axis voltage command value used to cancel a deviation between the T-axis current actual value and the T-axis current command value, based on the current addition signal and the T-axis current actual value;
leakage inductance calculation means for obtaining a leakage inductance calculation value of the AC motor based on the AC signal and the T-axis current actual value;
multiplication means for multiplying a differential value of one of the current addition signal and the AC signal by the leakage inductance calculation value and outputting a multiplication signal;
second addition means for adding the first T-axis voltage command value and the multiplication signal and outputting a second T-axis voltage command value;

M-axis current adjustment means for outputting an M-axis voltage command value used to cancel a deviation between the M-axis current command value and the M-axis current actual value; and
second coordinate conversion means for generating voltage command values for the AC motor based on the second T-axis voltage command value and the M-axis voltage command value, and outputting the generated voltage command values to the power converter.

9. The variable-speed control apparatus according to claim 8, wherein said leakage inductance calculation means comprises:
first amplitude calculation means for obtaining and outputting an amplitude of the AC signal;
second amplitude calculation means for obtaining and outputting an amplitude of the T-axis current actual value;
third addition means for subtracting an output of said second amplitude calculation means from an output of said first amplitude calculation means, and outputting a subtraction result; and
adjustment means for performing one of an integral operation and a proportional-plus-integral operation on an output of said third addition means, and obtaining the leakage inductance calculation value.

10. The variable-speed control apparatus according to claim 8, wherein
said leakage inductance calculation means further comprises filter means for selectively removing a component of a frequency lower than a frequency of the T-axis current actual value from a signal to be input to said second amplitude calculation means.

11. The variable-speed control apparatus according to claim 8, wherein said AC signal generation means comprises:
triangular wave generation means for outputting a triangular wave; and
integration means for integrating the triangular wave and outputting an integrated result as the AC signal.

12. The variable-speed control apparatus according to claim 8, further comprising:
memory means for storing a leakage inductance calculation value obtained by said leakage inductance calculation means, wherein
said multiplication means multiplies a leakage inductance calculation value stored in said memory means by a differential value of the AC signal and obtains the multiplication signal.

13. The variable-speed control apparatus according to claim 12, further comprising:
signal selection means for selectively outputting one of an output from said leakage inductance calculation means and an output from said memory means to said multiplication means.

14. The variable-speed control apparatus according to claim 13, wherein
said signal selection means selects the output from said leakage inductance calculation means when the AC motor is not operated, and selects the output from said memory means while the AC motor is being operated.

15. A method of controlling a variable speed of an AC motor by adjusting an electric current provided to the AC motor, comprising the steps of:
obtaining an M-axis current actual value and a T-axis current actual value for the AC motor based on a detection value of the electric current provided for the AC motor;

generating an M-axis current command value and a T-axis current command value for the AC motor;

generating an AC signal;

adding the M-axis current command value and the AC signal, and outputting an electric current addition signal;

outputting a first M-axis voltage command value used to cancel a deviation between the M-axis current actual value and the M-axis current command value based on the current addition signal and the M-axis current actual value;

obtaining a leakage inductance calculation value of the AC motor based on the AC signal and the M-axis current actual value;

multiplying a differential value of one of the current addition signal and the AC signal by the leakage inductance calculation value and obtaining a multiplication signal;

adding the first M-axis voltage command value and the multiplication signal and obtaining a second M-axis voltage command value;

obtaining a T-axis voltage command value used to cancel a deviation between the T-axis current command value and the T-axis current actual value; and generating voltage command values for the AC motor based on the second M-axis voltage command value and the T-axis voltage command value.

16. A method of controlling a variable speed of an AC motor by adjusting an electric current provided to the AC motor, comprising the steps of:

obtaining an M-axis current actual value and a T-axis current actual value for the AC motor based on a detection value of the electric current provided for the AC motor;

generating an M-axis current command value and a T-axis current command value for the AC motor;

generating an AC signal;

adding the T-axis current command value and the AC signal, and outputting a current addition signal;

outputting a first T-axis voltage command value used to cancel a deviation between the T-axis current actual value and the T-axis current command value based on the current addition signal and the T-axis current actual value;

obtaining a leakage inductance calculation value of the AC motor based on the AC signal and the T-axis current actual value;

multiplying a differential value of one of the current addition signal and the AC signal by the leakage inductance calculation value and obtaining a multiplication signal;

adding the first T-axis voltage command value and the multiplication signal and obtaining a second T-axis voltage command value;

obtaining an M-axis voltage command value used to cancel a deviation between the M-axis current command value and the M-axis current actual value; and generating voltage command values for the AC motor based on the second T-axis voltage command value and the M-axis voltage command value.

* * * * *